(12) United States Patent
Le Hoang et al.

(10) Patent No.: US 8,177,255 B2
(45) Date of Patent: May 15, 2012

(54) DEVICE FOR SECURING AN AIRBAG DEPLOYMENT PANEL

(75) Inventors: Daniel Le Hoang, Chambly (FR);
Jérôme Meziere, Bois Colombes (FR);
Michael Brunet, Therdonne (FR)

(73) Assignee: Faurecia Interieur Industrie, Nanterre (FR)

( * ) Notice: Subject to any disclaimer, the term of this patent is extended or adjusted under 35 U.S.C. 154(b) by 71 days.

(21) Appl. No.: 12/935,994

(22) PCT Filed: Apr. 3, 2009

(86) PCT No.: PCT/FR2009/050571
§ 371 (c)(1),
(2), (4) Date: Nov. 23, 2010

(87) PCT Pub. No.: WO2009/136041
PCT Pub. Date: Nov. 12, 2009

(65) Prior Publication Data
US 2011/0109067 A1     May 12, 2011

(30) Foreign Application Priority Data
Apr. 3, 2008   (FR) ..................................... 08 52210

(51) Int. Cl.
*B60R 21/16*     (2006.01)

(52) U.S. Cl. ..................................... 280/728.3; 280/732
(58) Field of Classification Search ............... 280/728.3, 280/728.1, 732
See application file for complete search history.

(56) References Cited

U.S. PATENT DOCUMENTS
5,398,959 A * 3/1995 Avila ......................... 280/728.3

FOREIGN PATENT DOCUMENTS
| DE | 19645866 A1 | 5/1998 |
| EP | 1033293 A | 9/2000 |
| JP | 07285406 A | 10/1995 |
| WO | 0228691 A1 | 4/2002 |

* cited by examiner

*Primary Examiner* — Eric Culbreth
(74) *Attorney, Agent, or Firm* — Young & Thompson

(57) ABSTRACT

This device includes a flexible net (26), a first end portion (28) of which is overmolded by the flap (20) and a second portion (30) is overmolded by a support element (24), the central portion extending between the first and second portions (28, 30) forming a flexible hinge (22) for articulating the flap (20) relative to the support element (24). The second portion (30) includes an end part (32) protruding from the support element (24) on the opposite side to the hinge-forming part (22), the end part (32) including a stop element, such that, when the airbag is deployed, the stop element prevents the second part (32) from being pulled out of the support element (24).

12 Claims, 2 Drawing Sheets

DEVICE FOR SECURING AN AIRBAG DEPLOYMENT PANEL

Figure 1:
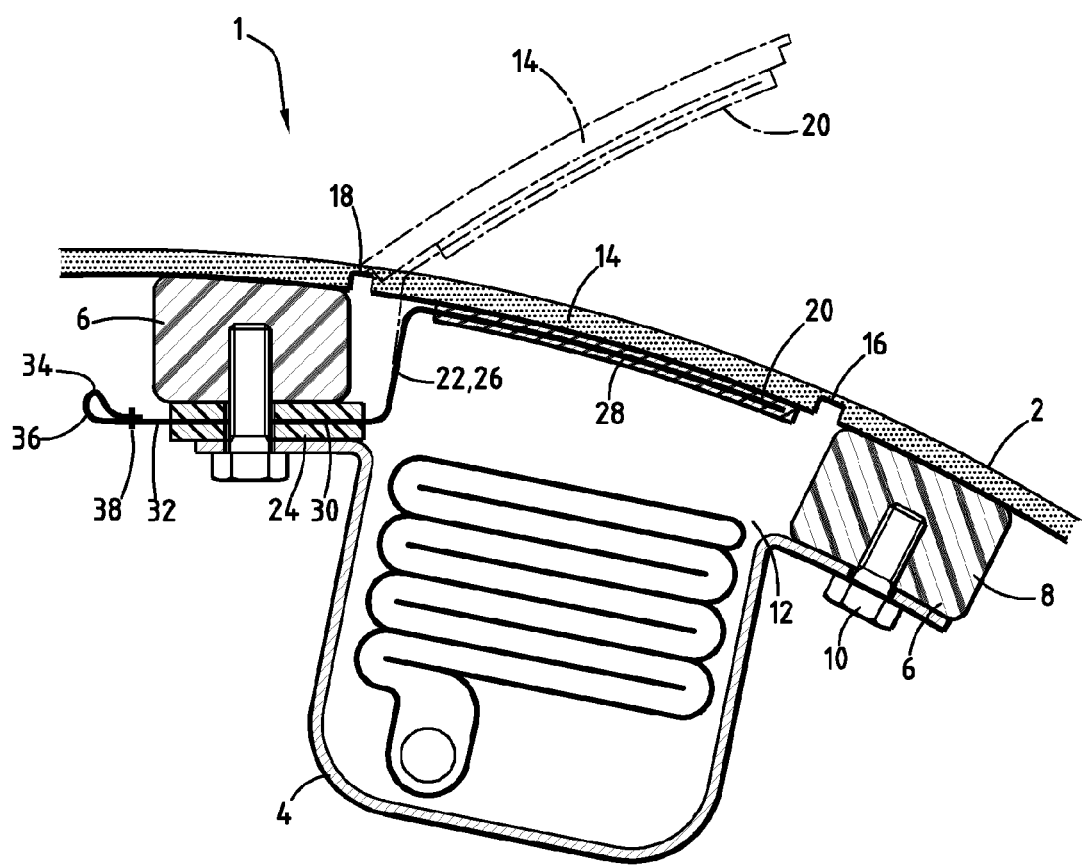

The present invention relates to a device for securing a closing flap of an airbag housing, of the type comprising a flexible net, a first end portion of which is overmolded by said flap and a second portion is overmolded by a support element, the central portion extending between said first and second portions forming a flexible hinge for articulating the flap relative to the support element.

The dashboard of a motor vehicle is generally equipped with an airbag housing intended to protect the vehicle's passenger in case of collision against the vehicle. The airbag housing is arranged under a continuous skin forming the visible portion of the dashboard such that the housing is masked by the skin and is substantially invisible from the interior compartment of the vehicle. The skin then comprises a breakable area tearing during deployment of the airbag in order to free a passage for the airbag toward the compartment.

In order to drive the tearing and movement of the skin when the airbag is deployed, a rigid flap is attached to the portion of the skin that must move and arranged in the vicinity of the breakable portion under the skin. The deployment of the airbag causes the displacement of the flap, which transmits the energy of said displacement to the skin due to its rigidity.

The flap is articulated relative to the airbag housing a hinge. Flexible hinges are known that are formed by a net overmolded on one hand by the flap and on the other hand by a support element of the airbag housing. The portion of the net extending between the portion overmolded by the flap and that overmolded by the support element forms the flexible hinge. This net is used both for rotation of the flap when the airbag is deployed and for retaining the flap so that it remains attached to the dashboard and does not escape into the compartment of the vehicle, which could be dangerous.

However, the energy of the airbag's deployment causes stresses on the net, which tends to delaminate in its portion overmolded by the support element. Such a delamination can cause the net to be pulled out of the support element or tear. The net then no longer serves its function of maintaining the flap relative to the dashboard, which constitutes a hazard for the occupants of the motor vehicle.

In order to offset this drawback, the length of the net overmolded with the support element is increased to prevent the net from being pulled out of said element, or centering pins are provided in the overmolding mold to guarantee accurate placement and maintenance of the net in the thickness of the overmolded plastic material.

Such solutions are not, however, satisfactory. Indeed, the available length for the overmolding of the net is limited by components surrounding the airbag housing. Moreover, to increase the length of the overmolded net, it is necessary to add plastic material, which increases the mass of the dashboard. The centering pins do not make it possible to guarantee correct positioning of the net in relation to the overmolded element. Indeed, the position of the net can vary depending on the method for injecting the plastic material. This position is in particular sensitive to the injection pressure and temperature of the plastic material. Moreover, the more centering pins there are, the more the overmolding of the net is made fragile due to the reduction of the quantity of injected plastic material. The support element then risks breaking during deployment of the airbag.

One of the aims of the invention is to offset these drawbacks by proposing a securing device of the aforementioned type in which the net does not risk being pulled out of the support element without adding mass on the support element and without requiring a particular adaptation of the overmolding mold.

To that end, the invention relates to a securing device of the aforementioned type, in which the second portion comprises an end part protruding from the support element on the opposite side to the hinge-forming part, said end part comprising a stop element, such that, when the airbag is deployed, the stop element prevents the second part from being pulled out of the support element.

According to other features of the securing device:
- the stop element comprises a seam made in the net in the end part of the second portion of said net;
- the net is folded on itself at the end part of the second portion of said net, the seam fastening the folded parts of the net to each other; and
- the stop element comprises an overmold element, said element at least partially overmolding the end part.

The invention also relates to a support element of an airbag housing of the type comprising a skin intended to cover said housing and a closing flap of said housing, said flap being secured to the support element by a securing device, wherein the securing device is of the type described above.

According to other features of the support element:
- the flap is also secured to said skin, such that the flap drives the displacement of a displaceable part of said skin when the airbag is deployed in order to free a passage for said airbag;
- the second portion of the net is overmolded in a piece made of a plastic material secured to the skin using means for securing the airbag housing to the support element;
- the piece and the securing means are made in a single piece;
- the skin comprises a breakable area arranged in the vicinity of a free end part of the flap, said area tearing when the airbag is deployed under the effect of the displacement of the flap, so as to free a passage for said airbag; and
- the skin comprises a hinge area arranged in the vicinity of the flexible hinge of the flap so as to allow the displacement of said skin when the airbag is deployed.

The invention also relates to a dashboard comprising a support element as described above and a motor vehicle comprising such a dashboard.

Figure 2:
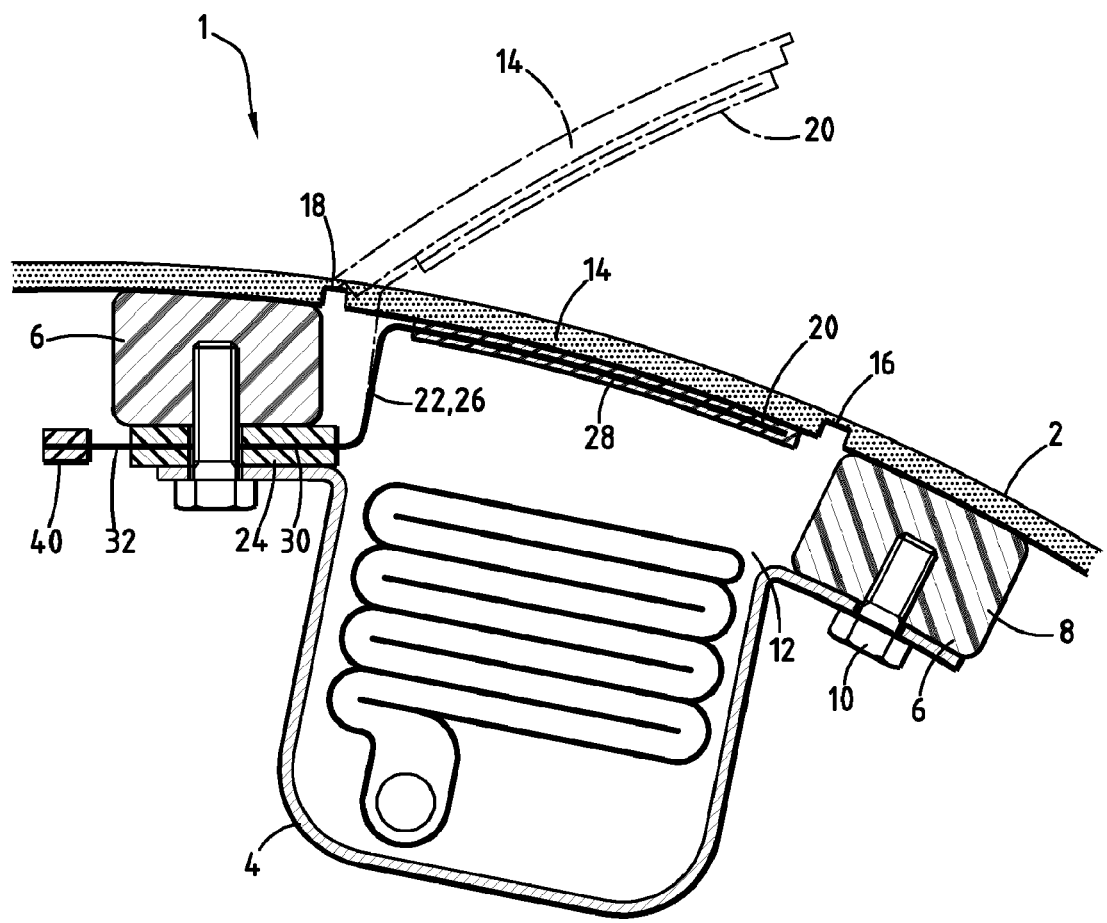

Other aspects and advantages of the invention will appear upon reading the following description, provided as an example and done in reference to the appended drawings, in which:

FIG. 1 is a diagrammatic cross-sectional illustration of a dashboard according to a first embodiment of the invention, FIG. 2 is a diagrammatic cross-sectional illustration of a dashboard according to a second embodiment of the invention.

The invention is described for a dashboard 1. However, it will be understood that the securing device of the invention can be used for other elements of a motor vehicle, such as trim panels of the compartment of the vehicle or the vehicle's steering wheel, etc.

The dashboard 1 comprises a skin 2 made of an injected plastic material. The skin 2 has a certain flexibility making the dashboard 1 agreeable to the touch and granting it sufficient rigidity to fulfill its purpose.

The skin 2 covers an airbag housing 4 that is secured to the skin 2 using securing means 6. This securing means 6 for example comprise at least one piece 8 made of a plastic material secured under the skin 2 and to which the housing 4 is screwed using screws 10.

The housing 4 comprises an opening 12 arranged opposite a displaceable area 14 of the skin 2. Thus, when the airbag is deployed, it passes through the opening 12 and bears against the displaceable area 14 so as to make it move to the position shown in dotted lines in FIG. 1 and free a passage for the airbag towards the compartment.

To allow the displacement of the area 14, an end portion of said area 14 comprises a breakable area 16 that tears when the airbag is deployed. This breakable area 16 is for example formed by a thinning of the skin 2 and by making a fusible seam between the displaceable area 14 and the rest of the skin 2.

The other end portion of the area 14 comprises a hinge area 18 allowing the displaceable area 14 to rotate in relation to the rest of the skin 2 after the breakable area 16 has been torn. This hinge area 18 is for example formed by thinning the material of the skin 2.

The skin 2 is not rigid enough to guarantee a suitable displacement of the area 14 when the airbag is deployed. Indeed, this area could just deform without causing the breakable area 16 to tear. In order to guarantee tearing of the breakable area 16 and therefore the displacement of the are 14, a rigid flap 20 is secured under the displaceable area 14 and against which the airbag bears when it is deployed. The rigidity of the flap 20 allows optimal transmission of the energy from the deployment of the airbag to the breakable area 16 so that the latter tears appropriately and the area 14 moves as desired. The flap 20 is made of an injected plastic material. The flap 20 is for example glued or welded to the skin 2.

The flap 20 is articulated relative to the fixed portion of the skin 2, to allow the displacement of the flap 20, which drives the displacement of the area 14 as shown by the dotted lines in FIG. 1. To that end, the flap 20 is connected by a flexible hinge 22 to a piece 24 made of plastic material forming the support element and secured to the skin 2 using the fastening means 6 of the airbag housing 4. The flexible hinge 22 also serves as a backup hinge, in case of break of the hinge area 18 of the skin 2, and makes it possible to prevent the flap and the displaceable area 14 from being ejected into the compartment when the airbag is deployed. According to an embodiment not shown, the piece 24 is made in a single piece with the securing means 6, i.e. the piece 24 is made in a single piece with the piece 8 secured under the skin.

The flexible hinge 22 is formed by a net 26, a first end part 28 of which is overmolded by the flap 20 and a second part 30 of which is overmolded by the piece 24. The portion extending between the first and second parts 28 and 30 forms a flexible hinge 22 allowing the flap 20 to be articulated relative to the fixed portion of the flexible skin 2. The breakable area 16 of the skin 2 is arranged in the vicinity of the free end part of the flap 20, i.e. the part by which the net does not enter the flap. The hinge area 18 of the skin 2 is arranged in the vicinity of the flexible hinge 22 of the flap 20.

The second part 30 of the net 26 comprises an end part 32 protruding from the piece 24 in which the second part 30 is overmolded. The end part 32 comes out of the piece 24 on the opposite side to the flexible hinge 22, as shown in FIGS. 1 and 2.

According to a first embodiment illustrated in FIG. 1, the end part 32 is folded on itself so as to have two portions 34 and 36 arranged one on the other. These two portions 34 and 36 are secured to each other by a seam 38. The folded portions 34 and 36, as well as the seam 38, thus form a stop element against the plastic piece 24 in case of displacement, driven by the displacement of the flexible hinge 22, of the second part 30 of the net inside the piece 24. Indeed, the thickness of the end part 32 is increased relative to the thickness of the second part 30 inside the piece 24. Thus if the flexible hinge 22 moves due to the energy deployed by the airbag and the violence of the displacement of the flap 20, the folded portions 34 and 36 as well as the seam 38 bear against the piece 24 and prevent the second part 30 from being pulled out of the piece 24.

According to a second embodiment illustrated in FIG. 2, the stop element is formed by an overmold element 40 at least overmolding the end part 32. If the flexible hinge 22 moves due to the energy deployed by the airbag and the violence of the displacement of the flap 20, the overmold element 40 bears against the piece 24 and prevents the second part 30 from being pulled out of the piece 24.

Thus, despite the violence of the displacement of the flap 20 that can cause delamination of the net 26, it is guaranteed that the part 30 will remain inside the piece 24 and there is no risk of the flap 20 and the displaceable area 14 coming apart from the skin 2. The flexible hinge 22 thus fulfills its role as backup hinge.

The second part 30 is kept in the piece 24 particularly simply, in a manner that does not require adding material and therefore mass to the dashboard. Moreover, no adaptation of the overmolding mold is necessary to overmold the net. One need only provide a net portion outside the mold to make the protruding end part 32.

The invention claimed is:

1. A device for securing a closing flap (20) of an airbag housing (4) comprising a flexible net (26), a first end portion (28) of which is overmolded by said flap (20) and a second portion (30) is overmolded by a support element (24), the central portion extending between said first and second portions (28, 30) forming a flexible hinge (22) for articulating the flap (20) relative to the support element (24), characterized in that the second portion (30) comprises an end part (32) protruding from the support element (24) on the opposite side to the hinge-forming portion (22), said end part (32) comprising a stop element, such that, when the airbag is deployed, the stop element prevents the second portion (32) from being pulled out of the support element (24).

2. The securing device according to claim 1, wherein the stop element comprises a seam (38) made in the net (26) in the end part (32) of the second portion (30) of said net.

3. The securing device according to claim 2, wherein the net (26) is folded on itself at the end part (32) of the second portion (30) of said net, the seam (38) fastening the folded parts (34, 36) of the net (26) to each other.

4. The securing device according to claim 1, wherein the stop element comprises an overmold element (40), said element at least partially overmolding the end part (32).

5. A motor vehicle dashboard comprising a support element of an airbag housing (4) comprising a skin (2) intended to cover said housing (4) and a closing flap (20) of said housing (4), said flap (20) being secured to the support element by a securing device, characterized in that the securing device is according to claim 1.

6. The dashboard, according to claim 5 characterized in that the flap (20) is also secured to said skin (2), such that the flap (20) drives the displacement of a displaceable part (14) of said skin (2) when the airbag is deployed in order to free a passage for said airbag.

7. The dashboard according to claim 6, wherein the second portion (30) of the net (26) is overmolded by a piece (24) made of a plastic material secured to the skin (2) using means (6) for securing the airbag housing (4) to the support element.

8. The dashboard according to claim 5, wherein the second portion (30) of the net (26) is overmolded by a piece (24) made of a plastic material secured to the skin (2) using means (6) for securing the airbag housing (4) to the support element.

9. The dashboard according to claim 8, wherein the piece (24) and the securing means (6) are made in a single piece.

10. The dashboard according to claim 5, characterized in that the skin (2) comprises a breakable area (16) arranged in the vicinity of a free end part of the flap (20), said area (16) tearing when the airbag is deployed under the effect of the displacement of the flap (20), so as to free a passage for said airbag.

11. The dashboard according to claim 5, characterized in that the skin (2) comprises a hinge area (18) arranged in the vicinity of the flexible hinge (22) of the flap (20) so as to allow the displacement of said skin (2) when the airbag is deployed.

12. A motor vehicle, characterized in that it comprises a dashboard (1) according to claim 5.

\* \* \* \* \*